United States Patent [19]
Gutteridge et al.

[11] Patent Number: 5,818,093
[45] Date of Patent: Oct. 6, 1998

[54] SEMICONDUCTOR DEVICE HAVING A MOVABLE GATE

[75] Inventors: Ronald J. Gutteridge, Paradise Valley; Margaret L. Kniffin, Tempe; Zuoying L. Zhang, Gilbert; Raymond M. Roop, Scottsdale, all of Ariz.

[73] Assignee: Motorola, Inc., Schaumburg, Ill.

[21] Appl. No.: 591,875

[22] Filed: Jan. 25, 1996

[51] Int. Cl.⁶ .......................... H01L 27/14; H01L 27/20; H01L 29/82
[52] U.S. Cl. .......................... 257/417; 257/252; 257/254; 257/415; 257/420
[58] Field of Search ................................. 257/252, 254, 257/415, 417, 420

[56] References Cited

U.S. PATENT DOCUMENTS

| | | |
|---|---|---|
| 4,873,871 | 10/1989 | Bai et al. . |
| 5,103,279 | 4/1992 | Gutteridge . |
| 5,181,156 | 1/1993 | Gutteridge et al. . |
| 5,447,067 | 9/1995 | Biebl et al. .............................. 257/417 |
| 5,504,356 | 4/1996 | Takeuchi et al. ....................... 257/417 |
| 5,572,057 | 11/1996 | Yammaoto et al. .................... 257/417 |

FOREIGN PATENT DOCUMENTS 0671629  9/1995  European Pat. Off. .

*Primary Examiner*—Valencia Martin Wallace
*Attorney, Agent, or Firm*—Rennie William Dover

[57] ABSTRACT

A semiconductor device (8) has a movable gate (20) over a semiconductor substrate (14) having a top surface (30). Source and drain regions (16–19) are in the substrate, and a channel region (24,25) is between the source and drain regions. The gate is suspended above the source and drain regions such that the gate is movable in a plane substantially parallel to the top surface of the substrate. In one embodiment the device is an accelerometer having the gate connected to a beam (10) with an aspect ratio between 2:1 and 10:1. Also, the gate can have first and second levels (22,23) corresponding to first and second threshold voltages of the channel region.

18 Claims, 3 Drawing Sheets

SEMICONDUCTOR DEVICE HAVING A MOVABLE GATE

BACKGROUND OF THE INVENTION

The present invention relates, in general, to semiconductor devices and, more particularly, to transistors having a movable gate suspended over an active region of a transistor.

Field effect transistors having a movable gate have previously been used as acceleration sensors. However, such sensors use a gate that moves in a plane perpendicular to the active or channel region. Therefore, these devices can only sense acceleration on a axis normal to the surface of the substrate in which the device has been formed, and thus, are practically limited to acceleration measurement along a single axis. Also, these prior sensors need mounting brackets for positioning the substrate in a plane normal to the mounting surface for those applications requiring lateral acceleration sensing. For example, such a mounting bracket is used for front-impact air-bag sensors on automobiles. Further, these prior sensors are susceptible to problems associated with stiction and as a result use high spring constants. High spring constants, however, reduce sensitivity, making these devices unsuitable for low-acceleration applications. Accordingly, there is a need for a movable gate semiconductor device that is not limited to measurement along a single, normal axis, that does not require a special mounting bracket for measurement along a lateral axis, and that does not require a high spring constant to avoid problems with stiction.

DETAILED DESCRIPTION OF THE DRAWINGS

Figure 1:
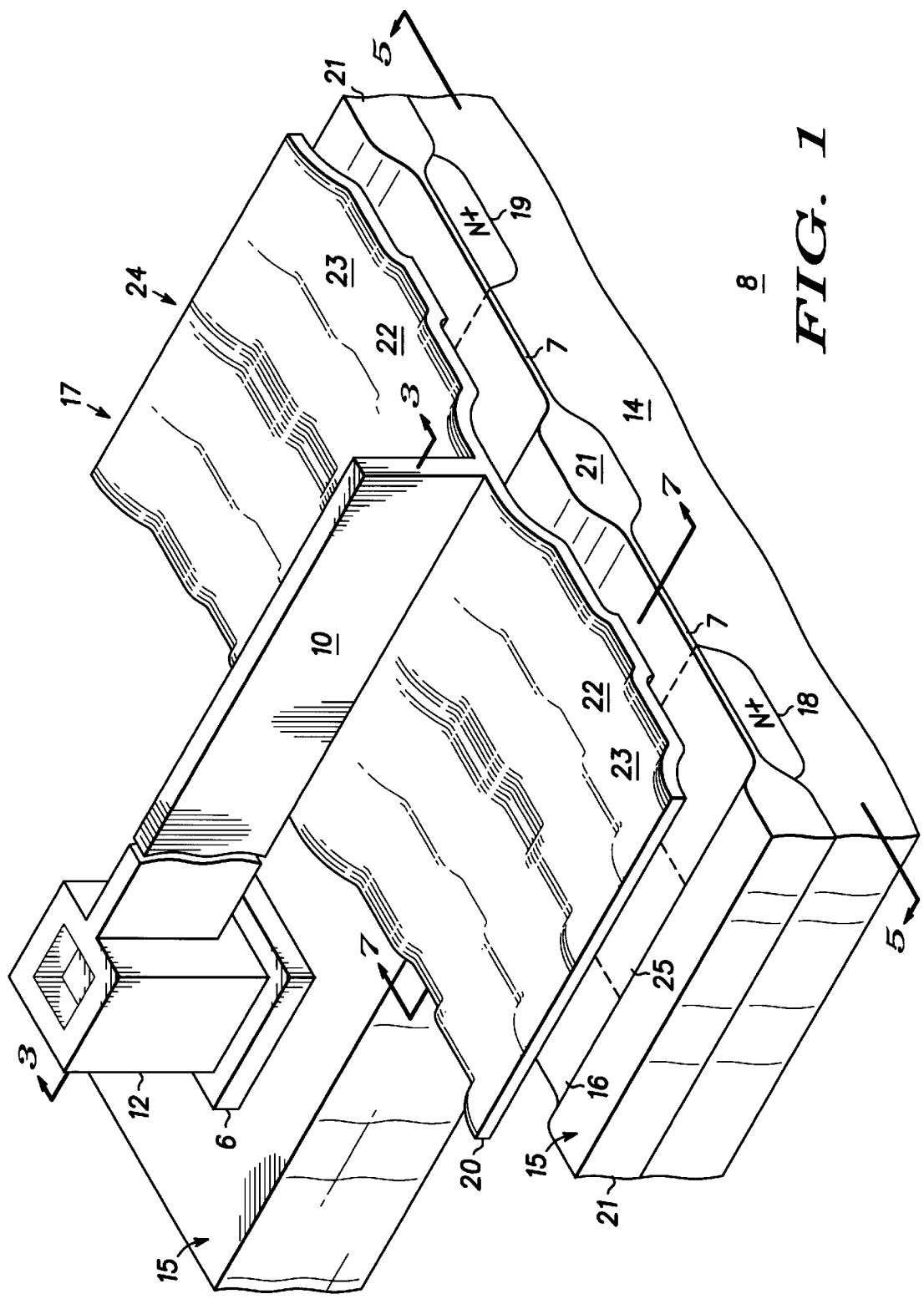
FIG. 1 is a simplified perspective view, in partial section, of a sensor according to the present invention.

FIG. 1 illustrates a sensor or accelerometer 8 according to an embodiment of the present invention. Sensor 8 has a movable gate 20 connected to a beam 10, which is fixedly mounted at one end to an anchor block or anchor 12. Beam 10 is shown as broken because in an actual sensor anchor block 12 is far removed from the mounting position of gate 20 to beam 10. Gate 20 overlies source regions 16 and 17 and drain regions 18 and 19, all of which are disposed in a substrate 14 (gate 20 is shown in FIG. 1 in partial section for ease of illustration). A channel region 25 is disposed between source/drain regions 16 and 18 and corresponds to a first transistor, and a channel region 24 is disposed between source/drain regions 17 and 19 and corresponds to a second transistor. As will be explained further below, these two transistors work together to provide measurement of acceleration along a lateral plane or axis parallel to substrate 14.

These two transistors are isolated from one another and other portions of substrate 14 by a field dielectric layer 21, and a gate oxide layer 7 covers source/drain regions 16–19 and channel regions 24 and 25. Also, as further illustrated in later figures, anchor block 12 is fixedly mounted relative to substrate 14 using a polysilicon base 6. A field nitride layer (shown in FIGS. 2–7) is disposed on a top surface 15 of field dielectric layer 21 and gate oxide layer 7, but is not shown in FIG. 1 for ease of illustration.

An important advantage of sensor 8 compared to prior accelerometers is that gate 20 moves in a plane substantially parallel to substrate 14. Thus, sensor 8 can be used to detect acceleration along an axis that is parallel to substrate 14. Lateral acceleration causes a lateral movement of gate 20, which in turn modulates the current through channel regions 24 and 25. This current modulation can be used to detect the acceleration as described further below.

Gate 20 preferably comprises a first level 22 and a second level 23. First level 22 corresponds to a portion of gate 20 that is disposed more closely to channel regions 24 and 25 to provide a first portion of each channel region with a relatively high transconductance. Second level 23 corresponds to a portion of gate 20 disposed further above channel regions 24 and 25 to provide a second portion of each channel region with a relatively low transconductance.

Generally, output from the two transistors above provides an input to a conventional differential amplifier so that common mode noise due to the effects of, for example, temperature, light, or power supply variation are canceled. More specifically, the total drain current flowing through one of the sense transistors can be described by the following expression:

$$I_D = I_1 W_1 + I_2 W_2$$

where $W_1$ is the width of the transistor that is covered by first level 22 of gate 20, $W_2$ is the width of the transistor that is covered by second level 23 of gate 20, and $I_1$ and $I_2$ represent the drain current per unit width that is flowing in each of these regions.

The difference between $I_1$ and $I_2$ arises from the difference in threshold voltage under levels 22 and 23 of gate 20. In this embodiment the threshold voltage is varied by changing the spacing between the channel region and gate 20. However, other techniques (such as partially metallizing the gate or varying the gate polysilicon doping along the width of the channel) could be used to achieve the same effect.

When an acceleration force is applied in a direction parallel to the plane of the die (i.e. substrate 14) and perpendicular to the length of the sense transistors, the gate structure will be displaced laterally by a distance y. The lateral displacement of the movable gate structure will alter the values of $W_1$ and $W_2$, resulting in a modulation of the net current ($I_D$) flowing through the device. The change in current is proportional to the applied acceleration and is given by the following expression:

$$\Delta I_D = y(I_1 - I_2)$$

In order to distinguish between changes in current output that arise from lateral motion of the movable gate structure and changes in current that arise from other input signals (such as temperature or acceleration forces normal to the plane of the die), it is desirable to design the sensor with two or more transistors, located beneath gate 20, connected in such a manner as to allow the separation of the desired signal from other spurious input signals. This can be accomplished by placing transistors on opposite sides of gate 20, so that the change in drain current due to a lateral acceleration for one of the transistors is equal and opposite to the change in drain current of the opposing transistor. The two transistors can then be connected so that they act as a differential pair. Changes in drain current due to changes in temperature, light or acceleration in the plane perpendicular to the device will appear as a common mode signal and can be substantially eliminated.

It should be noted that although gate 20 in this embodiment includes first and second levels 22 and 23, one of ordinary skill in the art will also appreciate that in other embodiments a single level could be used instead. Further, if desired, level 22 could be formed to be farther away from beam 10 than level 23.

The two transistors defined by source/drain regions 16–19 are preferably enhancement mode devices, but depletion mode devices can also be used. This is so because unlike previously-described sensors, in which the gate moves in a plane perpendicular to the channel region, the vertical spacing in the present invention is unaffected by inertial forces acting in the plane of the gate, and the threshold voltage remains constant. Also, source-to-drain current varies according to the proportion of the channel region under the influence of the gate electrode. Therefore, bi-directional sensing (+ve or –ve g) can be accomplished with enhancement mode devices.

In the preferred embodiment, gate 20 overlies all of channel regions 24 and 25 to provide complete channel coverage. This complete coverage provides physical and electrical shielding of the channel region for tighter control of the surface potential across the entire width of the channel. As a result, sensor output is generally more predictable.

Figure 2:
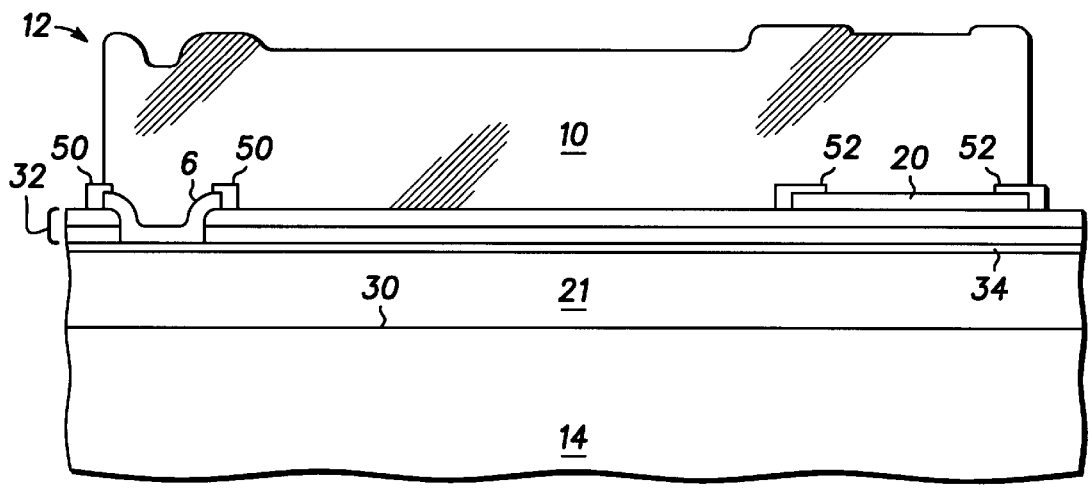
FIGS. 2 and 3 are cross-sectional views illustrating the formation of the sensor of FIG. 1 along a first cross-sectional view.
Figure 3:
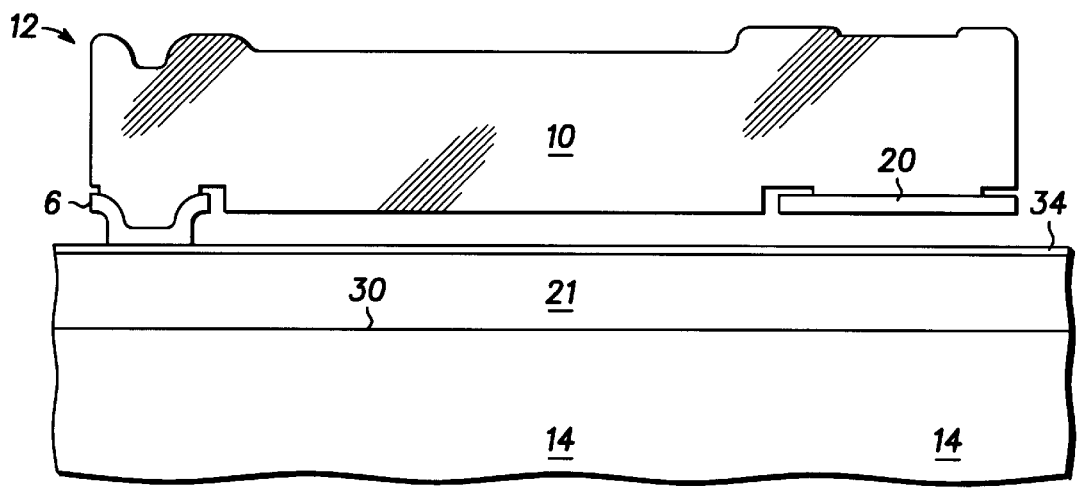

The manufacture of sensor 8 is now discussed with reference to FIGS. 2–7, which illustrate a particular fabrication sequence corresponding to the three different cross-sectional views indicated in FIG. 1. First, FIGS. 2 and 3 illustrate the formation of beam 10 and gate 20 for the cross-sectional view corresponding to FIG. 3. In FIG. 2, field dielectric layer 21 has been formed on a top surface 30 of substrate 14. Substrate 14 is, for example, p-type silicon having a <100> crystallographic orientation. Field dielectric layer 21 is, for example, silicon oxide with a thickness of about 10,000 angstroms and formed by conventional localized oxidation of substrate 14. Although not shown here in FIGS. 2 and 3, it should be noted that source/drain regions 16–19 are implanted following the formation of field dielectric layer 21 and then covered by gate oxide layer 7 (also not shown here), as will be discussed further below with reference to later figures. Next, a conventional silicon nitride layer 34 having a thickness of, for example, about 1,400 angstroms is deposited, such as by low-pressure chemical vapor deposition (LPCVD).

A sacrificial layer 32 is formed on silicon nitride layer 34 and will be removed later following the formation and structural release of beam 10 (see FIG. 3). Sacrificial layer 32 can be formed by blanket depositing a first silicon oxide layer 36, which can be, for example, a phospho-silicate glass (PSG) layer having about 4–7% phosphorus by weight and a thickness of about 1,500 angstroms. A relatively thin conventional silicon nitride layer 38 (shown only in FIGS. 4 and 6) is next blanket deposited and then patterned as discussed below for later forming first level 22 of gate 20. Patterned nitride layer 38 does not appear in FIG. 2 because this cross-sectional view does not cut through first level 22 (see FIGS. 5 and 7). Nitride layer 38 has a thickness, for example, of about 400 angstroms. A second silicon oxide layer 40 is then blanket deposited over patterned silicon nitride layer 38 (see FIGS. 4 and 6) and silicon oxide layer 36. Silicon oxide layer 40 is preferably, for example, also a PSG layer having about the same phosphorus by weight as used above for layer 36 and a thickness of about 10,000 angstroms.

After the formation of sacrificial layer 32, an opening is formed therein, using, for example, conventional photoresist and a buffered hydrogen fluoride solution, for the later formation of polysilicon base 6. Then, a blanket polysilicon layer (not shown) is deposited, for example, using LPCVD to a thickness of about 3,000–5,000 angstroms. This polysilicon layer is then conventionally patterned to provide polysilicon base 6 and gate 20 as illustrated in FIG. 2. This patterning can be done, for example, by reactive ion etching.

The exposed surfaces of polysilicon base 6 and gate 20 are oxidized, which provides an oxide layer 50 and an oxide layer 52, using, for example, a conventional hot process to form an oxide thickness of about 400 angstroms. Oxide layers 50 and 52 are then patterned to form openings for making contact with beam 10 later in the process. This patterning can be done, for example, either by reactive ion etching or wet etching.

Beam 10 is next formed, and for vertical stiffness it is desirable that beam 10 have an aspect ratio (i.e. height:width ratio) of about 2:1 to 10:1. To provide beam 10 in one preferred example, a blanket polysilicon layer (not shown) is preferably deposited to have a thickness (which corresponds to the height of beam 10) of, for example, about 3,000–500,000 angstroms, and more preferably about 20,000–100,000 angstroms. In one approach, this thick polysilicon layer can be formed in a conventional epitaxial reactor by the hydrogen reduction of a chlorinated silane, such as dichlorosilane, at a temperature of about 900°–1,200° C. Preferably, this hydrogen reduction is preceded by the formation of a nucleation layer on the exposed oxide surfaces of oxide layers 50 and 52 and silicon oxide layer 40. A preferred nucleation layer is a relatively thin LPCVD polysilicon blanket layer.

After depositing the thick polysilicon layer, a conventional photoresist and etching process is used to pattern this layer to form beam 10 and anchor block 12. Because of the desired aspect ratio of beam 10, it is preferred that this etch have good anisotropy, which can be accomplished, for example, by reactive ion etching using carbon tetrachloride.

After patterning beam 10, an annealing process is used to relieve stress in beam 10 and gate 20 and also in anchor block 12 and polysilicon base 6. Prior to performing this anneal, it is preferable to deposit a blanket PSG layer, similar in composition to silicon oxide layers 36 and 40, over beam 10 and silicon oxide layer 40. The blanket layer (not shown) has a thickness of about 10,000 angstroms, and helps to minimize any stress gradients that remain after the anneal process. In one approach, the anneal is accomplished in two steps with the first step being an anneal at a temperature of about 1,000°–1,050° C. for about 5 hours followed by a second step of rapid thermal annealing (RTA) at 1,050°–1,150° C. for about 60 seconds.

After annealing, conventional metallization and contacts (not shown) are formed. Next, sacrificial layer 32 and the optional blanket layer above are removed by, for example, wet etching in a 6:1 buffered HF solution at about 35° C. for about 15 minutes. The removal of sacrificial layer 32 releases beam 10 and gate 20. It should be noted here that the removal of sacrificial layer 32 also substantially removes oxide layers 50 and 52. FIG. 3 illustrates sensor 8 after sacrificial layer 32 has been removed. In those areas where beam 10 is in direct contact with underlying polysilicon, a strong mechanical joint is formed. Thus, beam 10 is firmly attached to substrate 14 through polysilicon base 6. Also, beam 10 is firmly attached to gate 20.

Figure 4:
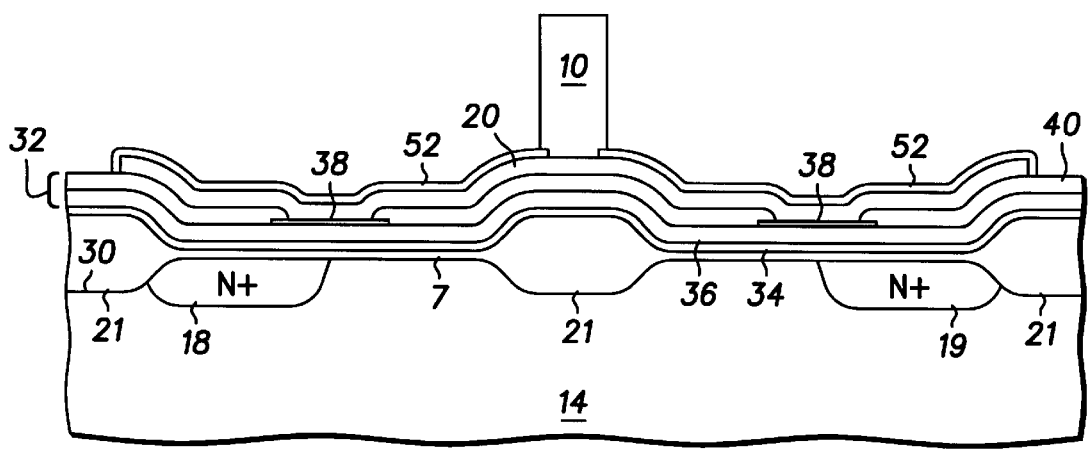
FIGS. 4 and 5 are cross-sectional views illustrating the formation of the sensor of FIG. 1 along a second cross-sectional view.
Figure 5:
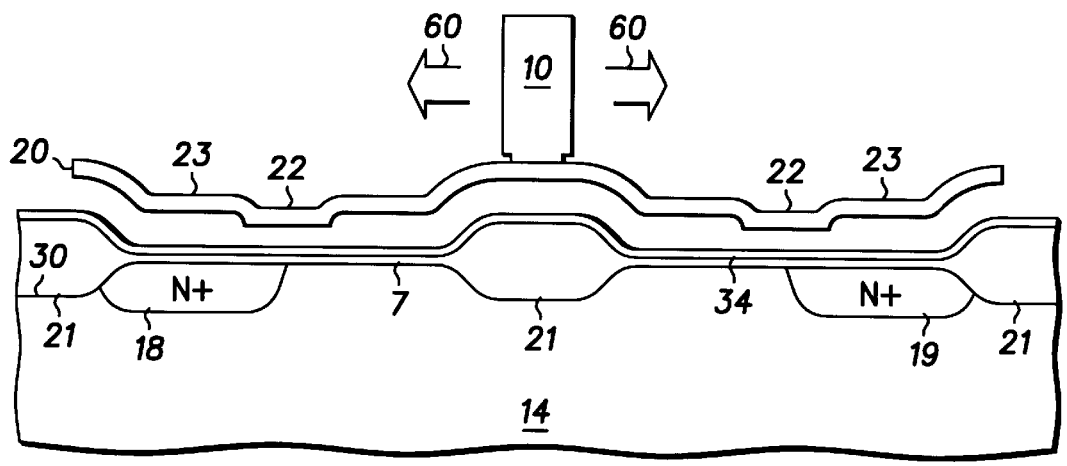

FIGS. 4 and 5 further illustrate the above processing of sensor 8 along a cross-sectional view corresponding to FIG.

5. The processing steps discussed with respect to FIGS. 4 and 5 are substantially the same steps discussed above, but with certain modifications as discussed below. In FIG. 4, field dielectric layer 21 has been formed as before. Then, drain regions 18 and 19 and source regions 16 and 17 (see FIG. 1) are, for example, implanted into substrate 14 using a conventional sacrificial oxide layer (not shown). Gate oxide layer 7 is then formed over these source/drain and channel regions using a conventional process to a thickness of, for example, about 500 angstroms. Silicon nitride layer 34 is next formed as before.

Sacrificial layer 32 is formed as described previously, but patterned silicon nitride layer 38 now appears in this cross-sectional view. Specifically, after forming silicon oxide layer 36, silicon nitride layer 38 is blanket deposited and patterned as done above. Silicon nitride layer 38 is then patterned in regions corresponding to first level 22 of gate 20 (see FIG. 5) for use as an etch stop, as will become more clear below. After patterning silicon nitride layer 38, silicon oxide layer 40 is blanket deposited over silicon oxide layer 36 and the patterned portions of silicon nitride layer 38.

After fully forming sacrificial layer 32 as described above, openings are formed in silicon oxide layer 40 using silicon nitride layer 38 as etch stop. These openings are later used to form first level 22 of gate 20. Preferably, the formation of these openings is performed in the same etching step used to form the opening in sacrificial layer 32 for polysilicon base 6 (see FIG. 2). An etch time is chosen to clear the combined thicknesses of first and second silicon oxide layers 36 and 40. Thus, the opening is formed fully through both silicon oxide layers 36 and 40 as mentioned above for polysilicon base 6, but silicon nitride layer 38 prevents the etching of underlying portions of silicon oxide layer 36 in the vicinity of gate 20. This chosen etch time results in a slight over-etch of second silicon oxide layer 40, but the control of lateral dimensions is well within acceptable tolerances. As is seen in FIG. 5, the position of patterned silicon nitride layer 38 corresponds to first level 22 of gate 20.

After forming these openings over silicon nitride layer 38, the blanket polysilicon layer (not shown) is formed and patterned as described above for FIG. 2 to provide gate 20. Then, oxide layer 52 is formed by oxidation of gate 20 as described previously. Oxide layer 52 is patterned to provide an opening for contact between gate 20 and beam 10, which is to be formed next. A thick polysilicon layer is then deposited and patterned as described above to provide beam 10 with the desired aspect ratio. Sensor 8 is annealed as described previously, and then sacrificial layer 32 is removed as discussed above.

FIG. 5 illustrates gate 20 and beam 10 after release from sacrificial layer 32. Arrows 60 indicate the general displacement direction of gate 20 and beam 10 in response, for example, to lateral acceleration. A typical displacement of beam 10 is about 0.2 microns. Levels 22 and 23 of gate 20 are illustrated in FIG. 5 and provide two different transconductances for the channel region of each transistor as discussed above. The physical position of first level 22 relative to the contour of gate 20 shown in FIG. 5 is preferably selected so that lateral displacement of gate 20 is not restricted by adjacent features.

As discussed above, drain regions 18 and 19 correspond to two transistors acting as a differential transistor pair for sensing acceleration. Displacement of gate 20 in the direction of arrows 60 simultaneously increases the width of channel region 25 (see FIG. 1) under the influence of first level 22 of gate 20 and decreases the width of channel region 24 (see FIG. 1) under the influence of first level 22 on the opposing side of gate 20. The effect is an increase in gain for the first transistor with a decrease in gain for the second transistor. At a fixed gate voltage, the source-drain currents of the two transistors will vary monotonically, but in opposition, as this displacement changes.

As seen in FIG. 5, the etch used to remove sacrificial layer 32 also attacks and substantially removes silicon nitride layer 38. Silicon nitride layer 34 is also etched in this step, but a sufficient thickness of silicon nitride layer 34 is provided when it is initially formed to account for this thinning.

Figure 6:
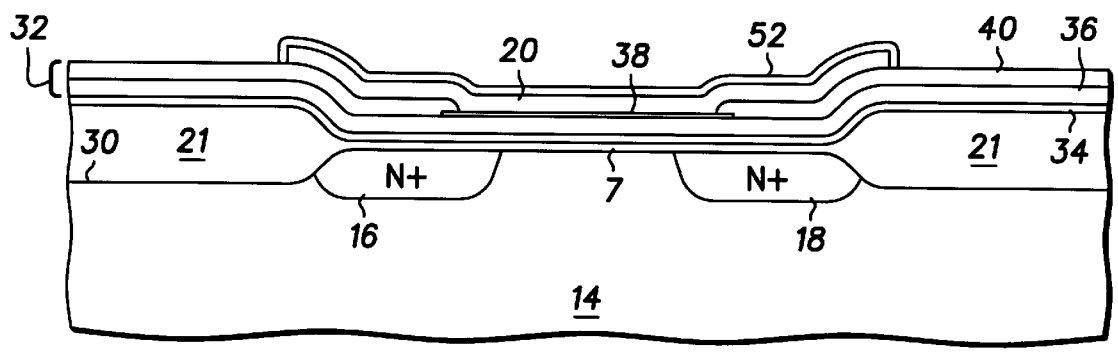
FIGS. 6 and 7 are cross-sectional views illustrating the formation of the sensor of FIG. 1 along a third cross-sectional view.
Figure 7:
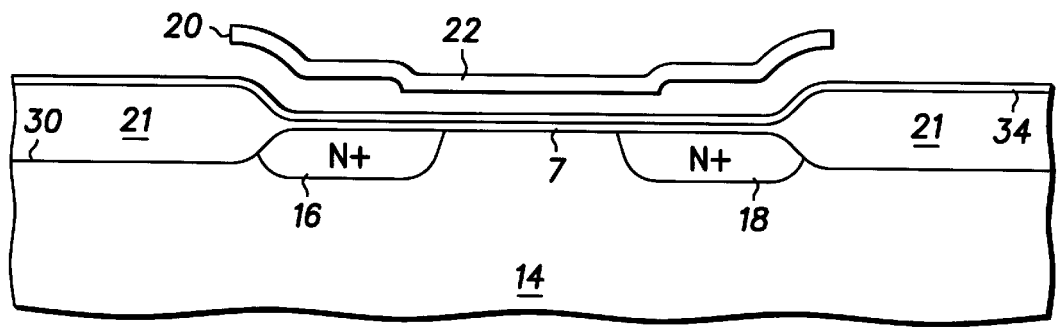

FIGS. 6 and 7 illustrate the formation of sensor 8 along a third cross-sectional view corresponding to FIG. 7. Again, substantially the same processing steps as discussed above are illustrated in FIGS. 6 and 7. In FIG. 6, field dielectric layer 21, source/drain regions 16 and 18, and gate oxide layer 7 are formed as above. Silicon nitride layer 34 and sacrificial layer 32 are also formed as described above. Again, silicon nitride layer 38 is patterned to substantially correspond to a region in which first level 22 (see FIG. 7) of gate 20 will be later formed. Oxide layer 52 is formed on gate 20 as described previously. It should be noted that oxide layer 52 does not have an opening shown in this cross-sectional view as beam 10 makes contact to a different portion of gate 20. FIG. 7 illustrates sensor 8 following the removal of sacrificial layer 32, which is done as before.

A description of further processing details that are useful with the present invention is described in U.S. Pat. No. 5,181,156, which issued on Jan. 19, 1993, to Gutteridge et al. and is titled "Micromachined Capacitor Structure and Method for Making", which is hereby incorporated by reference in full.

Sensor 8 as illustrated and as described above can measure acceleration along a lateral axis relative to substrate 14 to provide one-dimensional sensing. However, two-dimensional sensing can also be accomplished by an the addition of a second sensor. Further, three-dimensional sensing could be accomplished by a third sensor having sensitivity on an axis normal to the surface of substrate 14. Such normal-axis sensors are known and can be formed using processing compatible with that described herein.

The spring constant of sensor 8 is more advantageous than that of prior sensors. For a simple cantilever beam of fixed length and width, the spring constant in the lateral direction is a linear function of the beam's thickness or height, but in the vertical direction the spring constant increases as the cube of the beam's thickness. Thus, by increasing the aspect ratio of the beam (i.e. thickness: lateral width) from 1:1 to X:1, where X is the beam's thickness, a sensor can be built where the vertical spring constant exceeds the lateral spring constant by a factor of $X^2$. This is an advantage for surface micro-machined devices such as sensor 8. In contrast, prior sensors are limited to higher spring constants and lower sensitivities due to a necessary consideration of the surface attractive forces encountered in operation or during manufacture.

Although beam 10 has been illustrated above as being preferably anchored at a single end, in other embodiments beam 10 could be anchored by anchor blocks at each end, with gate 20 suspended about in the middle of beam 10. Further, multiple beams or tethers could be used to suspend gate 20 to decrease sensitivity to tilting forces.

Also, source/drain regions 16–19 have been illustrated as being substantially linear in layout. Because the length of beam 10 is relatively long compared to the displacement of gate 20, the movement of gate 20 is essentially in a straight line, which corresponds to linear source/drain regions. For shorter beams, however, arc-shaped source/drain regions may be preferred, which would correspond to a curvilinear path.

By now, it should be appreciated that there has been provided a novel semiconductor device having a movable gate, which can be generally used in sensors including accelerometers. The device according to the present invention permits sensing of acceleration along a lateral axis which is parallel to the substrate without the need for a special mounting bracket. Further, two such sensors can be used on a single die to measure acceleration in two dimensions, and these sensors do not require a high spring constant to avoid stiction problems. Examples of applications for the device of the present invention include side and front air-bag systems, active suspension systems, vehicle stability systems, active engine mounts, and noise cancellation systems. Yet another advantage is that the process described above can be readily integrated with a standard complimentary metal oxide semiconductor (CMOS) process so that, for example, resolving circuitry can be included on the same substrate 14 as sensor 8.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A semiconductor device, comprising:

a semiconductor substrate having a top surface;

a first source region and a first drain region disposed in said semiconductor substrate;

a channel region disposed between said first source region and said first drain region;

a gate disposed above said first source region and said first drain region, wherein said gate is movable in a plane substantially parallel to said top surface of said semiconductor substrate; and a beam connected to said gate wherein said beam is connected to said semiconductor substrate solely at a first end of said beam and said beam has an aspect ratio greater than about 2:1.

2. The device of claim 1 wherein said gate is connected at a second end of said beam.

3. The device of claim 1 wherein said gate and said beam are polysilicon.

4. A semiconductor device, comprising:

a semiconductor substrate having a top surface;

a first source region and a first drain region disposed in said semiconductor substrate;

a channel region disposed between said first source region and said first drain region; and a gate disposed above said first source region and said first drain region, wherein said gate is movable in a plane substantially parallel to said top surface of said semiconductor substrate and wherein said gate is supported by a beam having an aspect ratio between about 2:1 and 10:1.

5. The device of claim 4 wherein said beam is formed by hydrogen reduction of a chlorinated silane.

6. The device of claim 1 further comprising a second source region and a second drain region disposed in said semiconductor substrate, wherein said gate is above said second source region and said second drain region.

7. A semiconductor device, comprising:

a semiconductor substrate having a top surface;

a first source region and a first drain region disposed in said semiconductor substrate;

a channel region disposed between said first source region and said first drain region; and a gate disposed above said first source region and said first drain region, wherein said gate is movable in a plane substantially parallel to said top surface of said semiconductor substrate and wherein said gate comprises a first level and a second level, said first level corresponds to a first height above said channel region, said second level corresponds to a second height above said channel region, and said first height is less than said second height.

8. The device of claim 7 wherein a beam is connected to said gate at a central portion of said gate, said first level is proximate to said central portion, and said second level is distal from said central portion relative to said first level.

9. The device of claim 7 wherein said first level corresponds to a first threshold voltage of said channel region and said second level corresponds to a second threshold voltage of said channel region.

10. The device of claim 7 wherein said first level is disposed over a first portion of said channel region and wherein said second level is disposed over a second portion of said channel region.

11. The device of claim 10 wherein said gate completely overlies all of said channel region.

12. The device of claim 10 wherein a movable beam is connected to said gate and wherein said second portion of said channel region is more distal from said beam than said first portion of said channel region.

13. The device of claim 1 wherein said first source region and said first drain region are each substantially arc-shaped.

14. A sensor, comprising:

a semiconductor substrate having a top surface;

a first source region and a first drain region disposed in said semiconductor substrate;

a channel region disposed between said first source region and said first drain region;

a polysilicon gate disposed above said first source region and said first drain region, wherein said gate is movable in a plane substantially parallel to said top surface of said semiconductor substrate and wherein said gate comprises a first level and a second level, said first level corresponds to a first height above said channel region, said second level corresponds to a second height above said channel region, and said first height is less than said second height; and a polysilicon beam connected to said gate at a central portion of said gate, wherein an end of said beam is connected to an anchor fixedly mounted relative to said semiconductor substrate and said beam has an aspect ratio between about 2:1 and 10:1.

15. The sensor of claim 14 further comprising a second source region and a second drain region disposed in said semiconductor substrate, wherein said gate is above said second source region and said second drain region.

16. The sensor of claim 15 wherein said channel region functions in an enhancement mode.

17. The sensor of claim 14 wherein said polysilicon gate has a thickness of about 3,000–5,000 angstroms and said beam has a height of about 20,000–100,000 angstroms.

18. The sensor of claim 14 wherein said sensor is an accelerometer.

* * * * *